L. J. SOMMER, Jr.
QUICK ACTING BIB COCK.
APPLICATION FILED JUNE 2, 1908.

933,859.

Patented Sept. 14, 1909.

Witnesses
Oliver W. Holmes
Philip H. Burch

Inventor
Louis J. Sommer, Jr.
By Amand Brock
Attorneys

UNITED STATES PATENT OFFICE.

LOUIS J. SOMMER, JR., OF PHILADELPHIA, PENNSYLVANIA.

QUICK-ACTING BIB-COCK.

933,859. Specification of Letters Patent. Patented Sept. 14, 1909.

Application filed June 2, 1908. Serial No. 436,273.

*To all whom it may concern:*

Be it known that I, LOUIS J. SOMMER, Jr., a citizen of the United States, residing in Philadelphia, in the State of Pennsylvania, have invented a new and useful Improvement in Quick-Acting Bib-Cocks, of which the following is a specification.

This invention is a quick acting cock capable of use in connection with an ordinary sink faucet and also with faucets or cocks ordinarily used upon stationary washstands.

The object of the invention is to provide an exceedingly quick-acting valve-operating mechanism, and a still further object is to provide a valve of such construction and arranged in such a manner as to seat or close from below instead of from above, whereby the water pressure of the main will only be exerted upon the valve when closed, and in such a manner as to aid in keeping the valve seated upon its seat.

Another object of the invention is to so construct the valve and operating parts that the said parts will be protected from dirt and grit by the valve when said valve is opened.

With these various objects in view the invention consists in the novel features of construction, and combination of parts, all of which will be fully described hereinafter, and pointed out in the claim.

Figure 1:
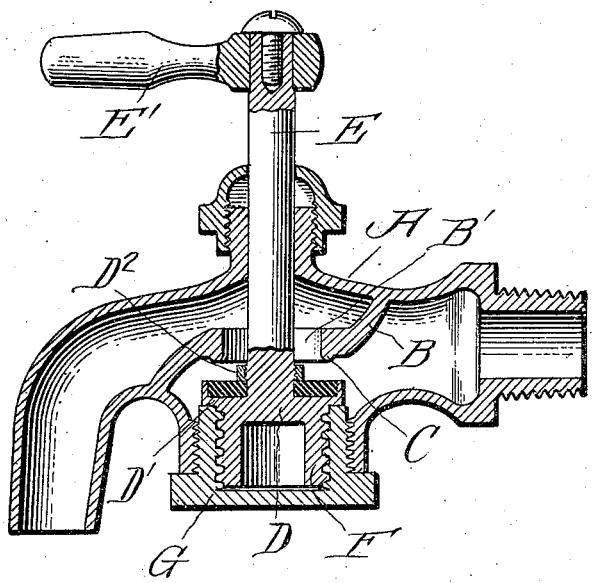
Figure 2:
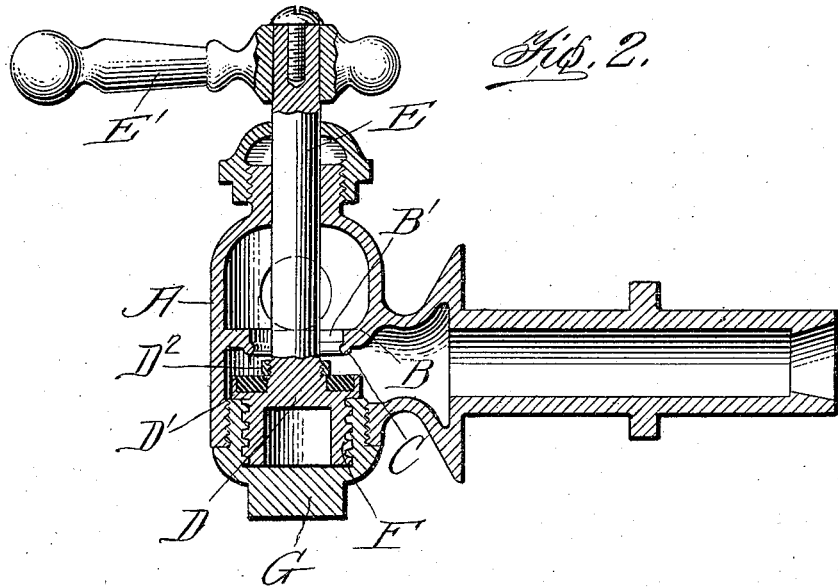

In the drawings forming a part of this specification: Figure 1 is a sectional view of a bib cock constructed in accordance with my invention, and Fig. 2 is a sectional view showing the application of my invention through a cock, particularly adapted for use in connection with a stationary-wash-stand.

Referring to the drawings A indicates a casing having the diaphragm B which is apertured as shown at B', and is constructed with a valve-seat C, but it will be noted that this seat is arranged or made upon the lower side of the diaphragm, instead of upon the upper side, as usual. The valve D is provided with any suitable form of facing D' which is held in place by means of a ring D² fastened upon the valve-stem E, said stem projecting through the casing and bonnet, and provided with any suitable form of handle E'. The valve D is formed with a threaded extension F, the threads being cut upon the exterior as shown, and it will be noted that these threads are very coarse, and it will be understood that they are also given a considerable pitch so that a partial turn of the valve-stem will be sufficient to open or close the valve, said threaded extension of the valve working in a nut closure G, said closure being threaded both internally and externally, as shown, the interior threads corresponding with the threads upon the valve-extension, while the exterior threads are of a standard scale, and are adapted to engage the threads of the opening formed in the bottom of the casing as most clearly shown in Figs. 1 and 2.

The valve extension F is preferably formed with a recess or chamber which serves as a cushion in opening and closing the valve, prevents the hammering or jarring action commonly incidental to valve-actions.

It will be noted that by having a very coarse thread upon the valve extension and nut, a slight movement of the valve-stem will immediately open or close the valve, and by having the valve open from the underside instead of the upper side, it is obvious that the pressure of the main is only exerted upon the valve when it is closed and it then serves to hold the valve upon its seat, and all grinding of the valve for the purpose of obtaining a firm seat is avoided. It will also be noted that when the valve is opened its rests upon the upper ends of the nut and thereby protects the threads of the said nut and valve-extension from grit and dirt.

It will thus be seen that I provide a simple and efficient construction of cock capable of accomplishing all of the objects hereinbefore referred to.

Having thus fully described my invention, what I claim as new and desire to secure by Letters Patent is:—

The combination with a casing having a diaphragm provided with a valve seat upon the under side thereof, said casing having a threaded opening in the bottom thereof, of a valve adapted to engage the seat, said valve having a depending threaded portion, the threads thereof being coarse, said extension having a central recess or chamber produced in the bottom thereof, an annular shoulder formed at the upper end of the coarse threads, and a closure having exterior and interior threads, said interior threads being adapted to receive the coarse threads of the valve extension, the upper end of said closure being adapted for engagement with the annular shoulder when the valve is opened and the exterior threads of said closure engaging the threads of the casing opening, substantially as described.

LOUIS J. SOMMER, Jr.

Witnesses:
CHAS. E. BROCK,
THOS. KILBY SMITH.